United States Patent [19]

Stropkay et al.

[11] Patent Number: 4,737,759
[45] Date of Patent: Apr. 12, 1988

[54] LEVEL WARNING DEVICE

[75] Inventors: Edward J. Stropkay, Mentor; Robert W. Boucher, Dayton, both of Ohio

[73] Assignee: Transgard, Inc., Willoughby, Ohio

[21] Appl. No.: 901,590

[22] Filed: Aug. 29, 1986

Related U.S. Application Data

[63] Continuation-in-part of Ser. No. 653,714, Sep. 24, 1984, abandoned.

[51] Int. Cl.$^4$ .................. B60Q 1/00; G08B 21/00
[52] U.S. Cl. .................. 340/52 H; 340/689; 200/61.52
[58] Field of Search .................. 340/52 H, 689, 539, 340/58; 298/22 R, 1 R; 200/61.5, 61.52, 61.83, DIG. 29; 250/222.1, 229, 231 R; 33/365, 366; 180/282; 455/99

[56] References Cited

U.S. PATENT DOCUMENTS

| | | | |
|---|---|---|---|
| 3,269,685 | 8/1966 | Wallace | 200/61.52 X |
| 3,464,755 | 9/1969 | Brown | 298/22 R |
| 3,601,729 | 8/1971 | Hierta | 200/61.52 X |
| 3,694,803 | 9/1972 | Strenglein | 340/539 X |
| 3,784,773 | 1/1974 | Jubenville | 200/61.45 M |
| 3,967,135 | 6/1976 | Balban et al. | 340/52 H X |
| 4,074,227 | 2/1978 | Kalmus | 340/58 |
| 4,349,809 | 9/1982 | Tomes | 340/52 H |
| 4,450,431 | 5/1984 | Hochstein | 340/539 X |
| 4,484,191 | 10/1984 | Vavra | 200/61.52 X |

Primary Examiner—James L. Rowland
Assistant Examiner—Brian R. Tumm
Attorney, Agent, or Firm—Burns, Doane, Swecker & Mathis

[57] ABSTRACT

A level warning device for dump trucks comprises a light transmissive tubular trackway having raised, closed ends and a mount for securing the tubular trackway to a transverse member of the bed of the truck. The trackway includes a detent at a central location which defines a pocket lateral of the passage defined within the trackway. The trackway itself comprises straight, tubular segments which are inclined with respect to a horizontal axis at angles equal to the critical angle at which the truck would likely start to turn over. Positioned above a central region of the trackway is a photo-electric switch. Optically aligned with the photo-electric switch from below the trackway is an element for emitting an infra-red beam through the tubular element. A ball which is sized to roll freely in the trackway and the pocket is held within the detent pocket while the bed is in a lowered position by reason of the inclination of the detent at such conditions. While in the pocket, a portion of the ball prevents the beam from striking the photo-electric switch.

5 Claims, 6 Drawing Sheets

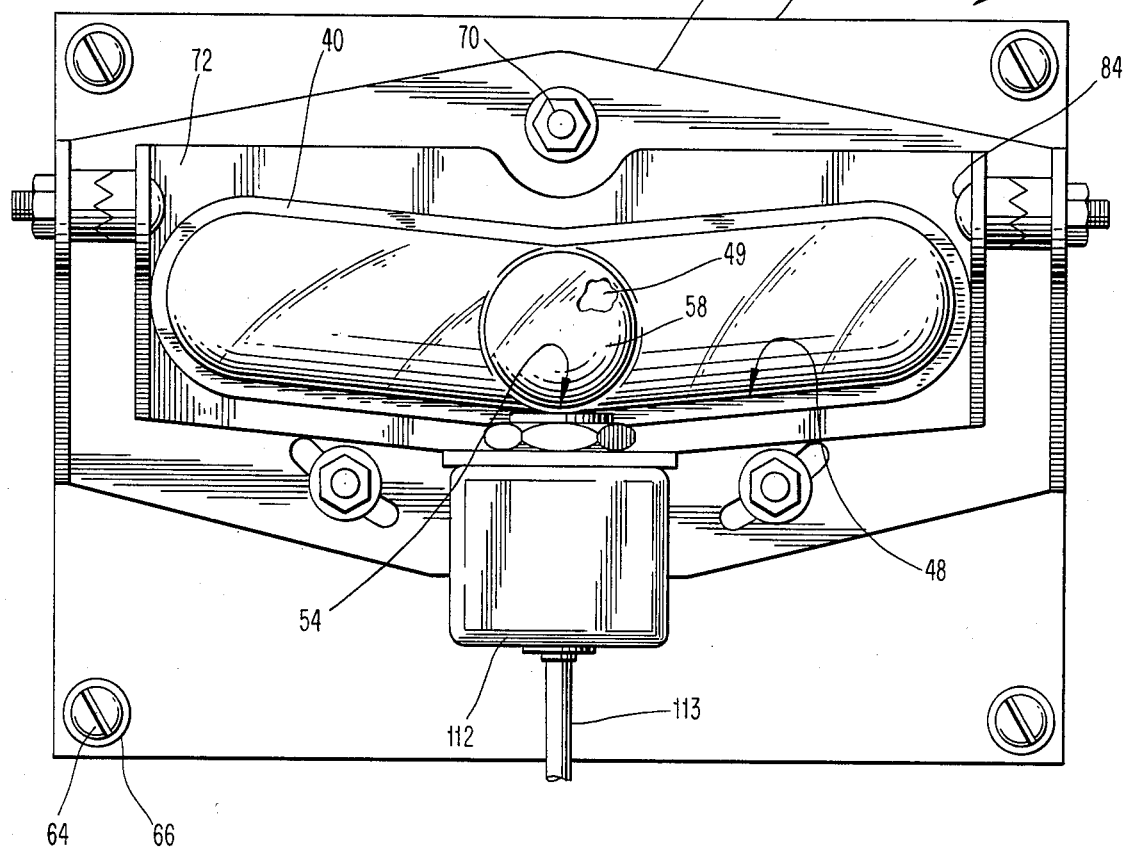
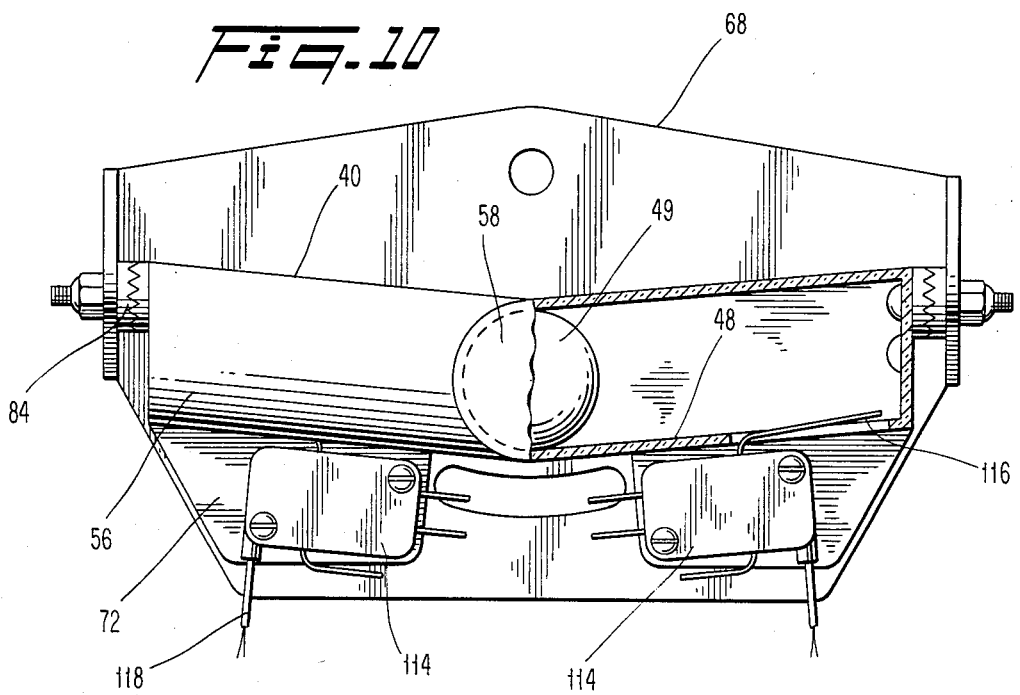

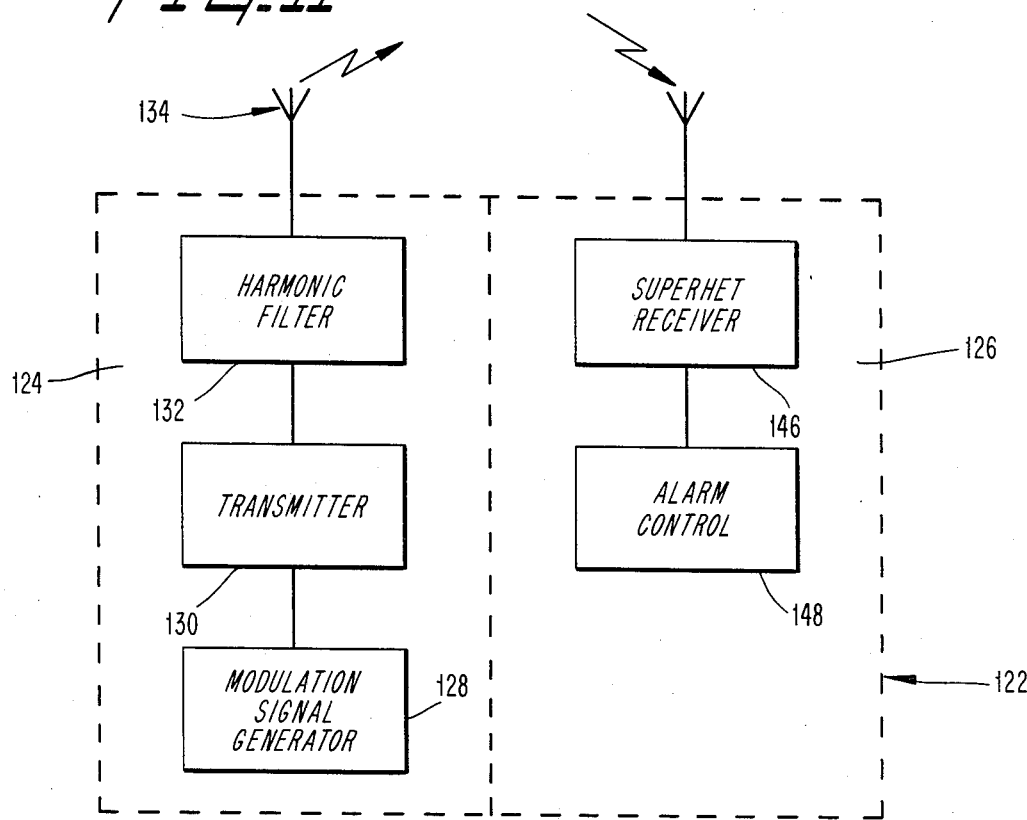
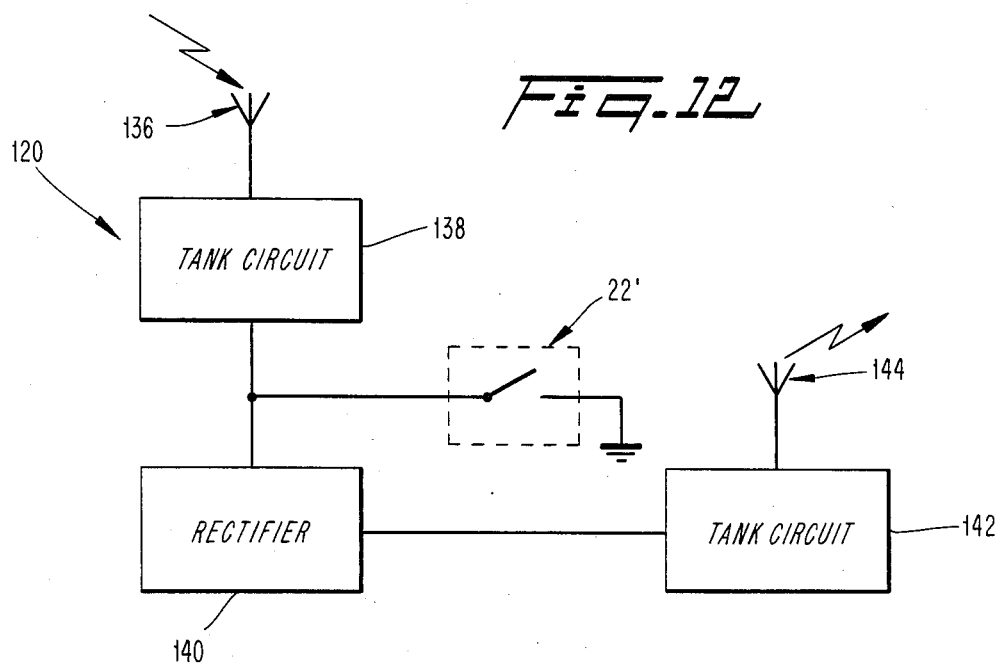

LEVEL WARNING DEVICE

CROSS-REFERENCE TO RELATED APPLICATION

This application is a continuation-in-part of application Ser. No. 653,714 filed Sept. 24, 1984, now abandoned.

FIELD OF INVENTION

The present invention relates generally to devices for indicating the attitude of a vehicle and more particularly, to warning devices for use with dump trucks for providing a warning whenever the bed of the truck has tilted laterally beyond safe limits.

DISCUSSION OF THE PRIOR ART

When the bed of a dump truck is raised, the truck's center of gravity rises substantially and the stability of the vehicle is greatly reduced. Once the vehicle has tilted beyond certain limits, it is highly prone to turning over on its side to the great peril of any persons situated nearby and, of course, to the driver.

Field experience has shown that in substantially every case of an overturned dump truck, the accident could have been prevented had either the truck been properly positioned before dumping, or the operator had sufficient notice that the truck was shifting.

It has further been learned through field experience that many truck drivers are not sufficiently familiar with the operation of dump trucks to properly judge when the truck may be safely dumped or, as it is being dumped, that it is in danger of overturning. It has also been found that when a driver is in a hurry, he may unnecessarily risk overturning the truck rather than take the time to position it properly.

Damages to dump trucks caused by overturning are very expensive to repair. Furthermore, down time is expensive and the high frequency of overturning causes the insurance premiums on dump trucks to be quite high. These costs are in addition to the danger to human life. Thusly, there has always been the need to have a device, preferably located on the truck itself, which provides a warning whenever a dump truck or like vehicle is beginning to exceed safe limits of lateral tilting so that corrective action can be taken.

U.S. Pat. No. 3,464,755 to Brown discloses a safety device for mounting along an axle of a dump truck which comprises two mercury switches in the form of opposing, inclined tubes having closed ends. If either mercury switch is tripped, the respective switch closes an override circuit to the dump actuator and closes a circuit to an indicator light. A switch is provided to deactivate the device to prevent intermittent flashing of the indicator light while the dump truck is moving.

U.S. Pat. No. 3,640,578 to Finney discloses a dump truck with an automatically adjustable stabilizing means for maintaining the dump trailer in a substantially level plane. The stabilizing means includes a control system having elongated, inclined mercury switches which electrically open and close in response to lateral tilting of the dump trailer. A switch is preferably situated in the cab of the dump truck which the operator closes just prior to dumping.

U.S. Pat. No. 3,921,128 to Snead discloses a dump truck roll warning system which include elongated mercury switches whose axes lie with a vertical plane transverse to the general axis of the trailer bed at predetermined angles of inclination. A horn is sounded whenever the tilting of the bed causes one of the switches to close. A master switch is provided to deactivate the system to prevent triggering of the system when it is not desired.

Each of the above described systems are disadvantaged in that they are to be switched off during vehicular movement and turned on again before each dumping operation. Consequently they rely on the memory of the driver to activate the system prior to his initiating dumping operations. However, the rush of activities at or about the dump sight usually proves very distracting for the driver and his attention is often committed to other things as backing up the truck, operating the actuator for the truck bed and receiving as well as returning signals to his work team. Accordingly, the driver is apt to forget the master switch of the warning device. Also, these prior devices do not permit the driver to simply keep the devices activated at all times to by-pass the problem of remembering the master switch, because none of the devices includes means for preventing their switches from being tripped as a result of jostling during movement of the truck. Unless these devices are turned off prior to travel, they subject the driver to annoying amounts of intermittent, spurious warnings.

U.S. Pat. No. 4,349,809 to Tomes discloses an apparatus for detecting the angle of inclination of vehicles such as Jeeps, which apparatus includes a tubular trackway filled with light oil and a plurality of balls situated within the trackway. At each end of the trackway are electrical contact points which complete a circuit to a warning indicator whenever they are struck by one of the balls. The plurality of balls and the lubricant serve to slow the reaction time of the device to reduce the likelihood that jerking or jolting of the vehicle will trigger the warning indicator spuriously.

Although the apparatus disclosed in Tomes might be maintained in an activated state during on or off road travel of the vehicle, it disadvantageously sacrifices the reaction time of the device in order to achieve that capability. The device is therefore unsuitable for use on dump trucks, because dump trucks need a warning to register as soon as the truck bed obtains a critical degree of leaning. Moreover, in instances where a vehicle is travelling along an incline, one of the balls of the Tomes device might be jostled continuously against one of the electrical contacts in the trackway and cause damage to both the ball and the contact. Over time, the damage might cause the device to malfunction. The device of Tomes also presents the leakage problems associated with oil filled cavities and their seals.

OBJECTS OF THE PRESENT INVENTION

It is therefore an object of the present invention to provide a level warning device for dump trucks, which device does not require an actuator switch and can be maintained in an activated state at all times during the operation of the vehicle.

Still another object of the present invention is to provide a level warning device which makes the job of unloading dump trucks more safe and cost effective.

It is another object of the present invention to provide a level warning device suitable for use with dump trucks having switches which are not vulnerable to damage from jostling during on and off road movement of the truck, yet is quick in response time.

Yet another object of the present invention is to provide a level warning device which is quick to register a warning once the bed of a truck has obtained a critical degree of leaning.

Still another object of the present invention is to provide a level warning device having a ball which rolls in a tubular trackway without interference from electrical contacts, oil or other objects along the path of its movement.

It is another object of the present invention to provide a level warning device having a ball which is capable of rolling in a tubular trackway at times when a truck bed is raised beyond a certain extent, but is stowed within a pocket at all other times to avoid spurious signaling and damage during times of vehicular movement.

Another object of the present invention is to provide a level warning device which provides a warning signal at a remote location without the necessity of connecting wires or cables.

A further object of the invention is to provide a level warning device including an angle sensor wherein the angle sensor does not require a direct power source.

Yet another object of the present invention is to provide an economic level warning device which is simple to install and requires minimal maintenance.

SUMMARY OF THE INVENTION

The present invention achieves these and other objects by providing a level warning device for dump trucks comprising a light transmissive tubular trackway having closed ends and a mount for securing the tubular trackway to a transverse member of the bed of the truck. The trackway includes a detent at a central location which defines a pocket lateral of the passage defined within the trackway. The trackway itself comprises straight, tubular segments which are inclined with respect to a horizontal axis at angles equal to the critical angle at which the truck would likely start to turn over. Positioned above the central region of the trackway is a photo-electric switch having a receiver. Optically aligned with the receiver from below the trackway is an element for emitting an infra-red beam through the tubular element. A ball sized to roll freely within the trackway and the pocket is held within the detent pocket while the bed is in a lowered position by reason of the inclination of the detent at such conditions. While in the pocket, a portion of the ball blocks the photo-electric switch. Once the bed is raised beyond a certain angular extent, the ball leaves the pocket to enter the trackway, whereat it is free to roll to one end of the trackway or the other under the influence of gravity. Because the tubular segments are straight, the ball does not begin to roll away from the central region of the trackway until the bed has been tilted to the critical angle. Once the ball rolls away from the central region of the trackway, the beam is no longer blocked from striking the photo-electric switch, whereupon the switch closes a circuit to a warning indicator. By such arrangement, the level warning device can remain activated during the entirety of the dumping operations, including off-road movement of the truck. Also, jostling of the device does not cause the ball to collide against any components within the trackway, because the ball is retained within the pocket during vehicular movement and because, in the preferred embodiment, there are no other components situated within the trackway. Also, the sensitivity of the device is enhanced because the ball rolls within a trackway free of any other components, liquids or other bodies which might restrict its movement.

The level sensing switch is preferably connected in an electric circuit which includes a passive transponder network. The transponder includes an antenna which receives a transmitted modulated signal. The received signal is supplied to a first tank circuit resonant at the fundamental frequency of the transmitted signal. During normal operation, i.e. when the level sensing switch is open, the signal is then rectified and supplied to a second tank circuit which is resonant at the third harmonic of the fundamental frequency. Energy from the rectified signal causes the second tank circuit to oscillate at the third harmonic. A transmitting antenna is coupled to the second tank circuit to transmit a signal having a frequency three times the fundamental frequency of the received signal. Receipt of the third harmonic signal at a remote location indicates safe operation. However, when the level sensing switch is closed due to an unsafe position of the truck bed, the fundamental tank circuit is shorted by the level sensing switch, whereupon the third harmonic signal is not transmitted by the passive transponder. Thus, an indication of the unsafe condition is provided at a remote location by the absence of the third harmonic signal.

BRIEF DESCRIPTION OF THE DRAWINGS

The preferred embodiments of the present invention are described in detail with reference to the accompanying drawings wherein like members bear like reference numbers and wherein:

FIG. 6b is a detail view of the truck bed of FIG. 6a as viewed in the direction of the arrow VI in FIG. 6a;

FIG. 9 is a frontal view of elements of a level warning device constructed in accordance with another preferred embodiment of the present invention, wherein the mounting tray is at an uninclined position and the switching element is a proximity switch;

FIG. 10 is a frontal view of elements of a level warning device constructed in accordance with another preferred embodiment of the present invention, wherein the mounting tray is at an uninclined position and the switching element comprises a pair of microswitches;

FIG. 11 is a schematic illustration of a transceiver for use in the present invention; and FIG. 12 is a schematic illustration of the passive transponder network for use in the present invention.

DETAILED DESCRIPTION OF THE PREFERRED EMBODIMENTS

Figure 6A:
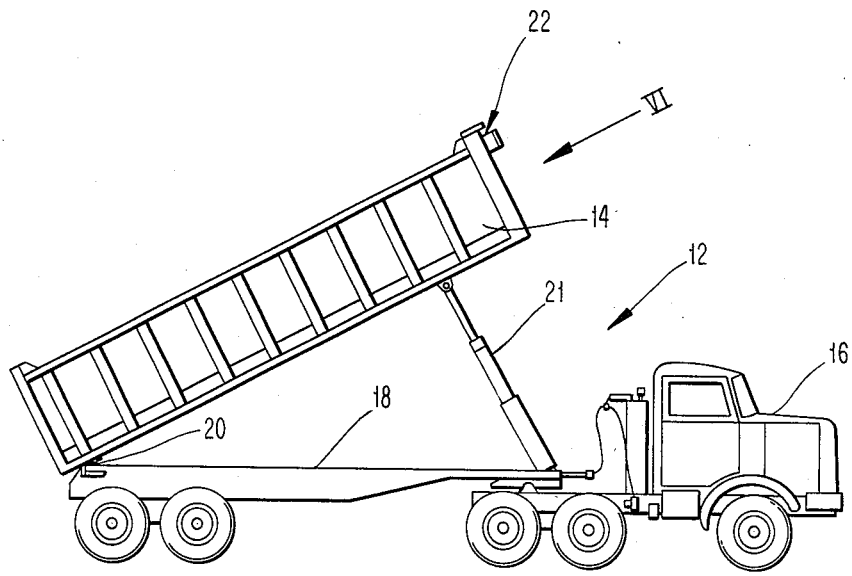
FIG. 6a is a dump truck with a bed to which the device of FIG. 1 is mounted.

Referring to FIG. 6a, there is shown a dump truck 12 comprising a truck bed 14 coupled to a tractor 16. The truck bed 14 is supported at its rear end by a frame 18 through a pivotal connection 20. The truck bed 14 is raised to the dumping position of FIG. 6a by a telescoping cylinder 22 which is connected between the front end of the truck bed 14 and the frame 18. The telescoping cylinder 22 is normally powered by a hydraulic system (not shown) having manual controls. When the bed 14 is raised beyond a certain angular extent, usually about 25°, the dump truck 12 is prone to turn over on its side if the bed 14 is allowed to tilt laterally beyond a predetermined angle to either side of the truck 12. These angles (hereafter "critical angles") lie within a vertical plane transverse to the length of the truck bed 14 and are either known to the maker of the particular dump truck or are readily determined through experimentation or analytical techniques. For purposes of the preferred embodiment, these critical angles have been determined to be 5½ degrees of incline to either side of the dump truck 12 when the truck bed has been raised by 25°. Securely affixed to the upper, front portion of the truck bed 14 is a level warning device 22 of the present invention.

Figure 3:
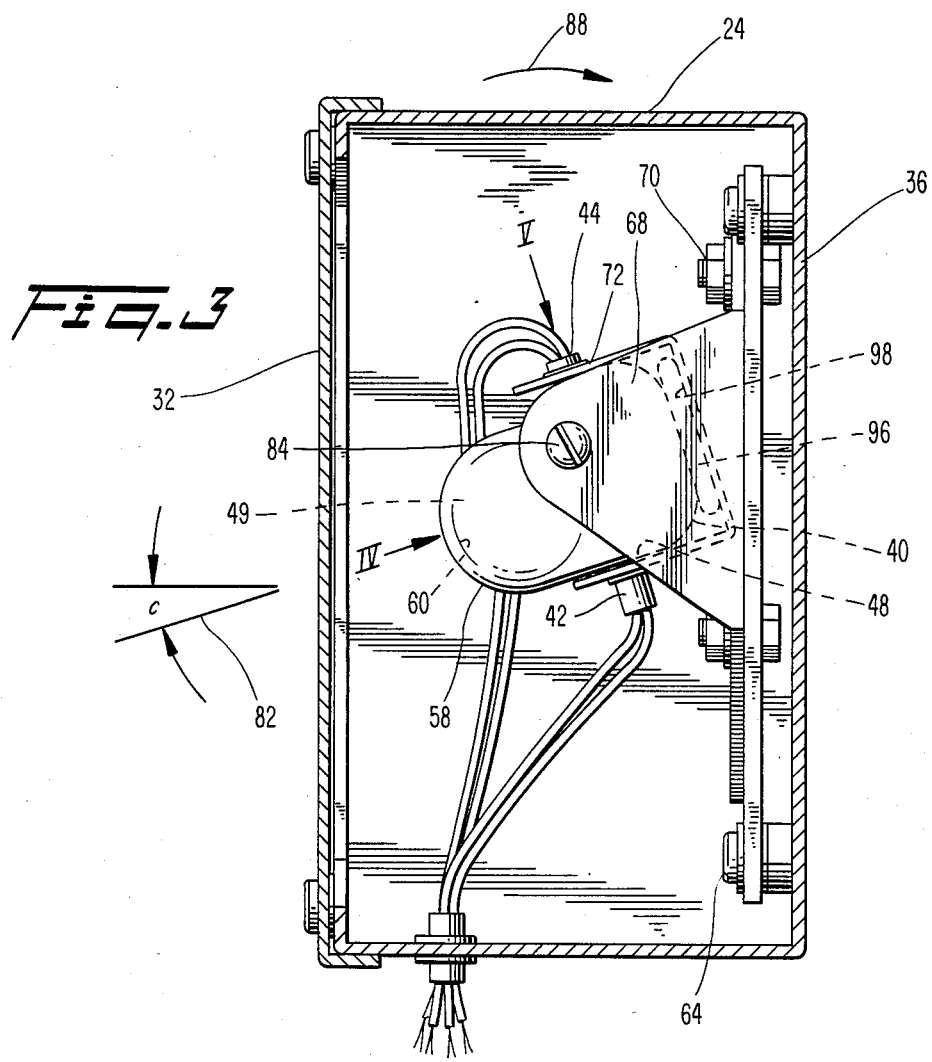
FIG. 3 is a side view of the elements of FIG. 1 with the housing shown in cross-section and with the cover in place.
Figure 6B:
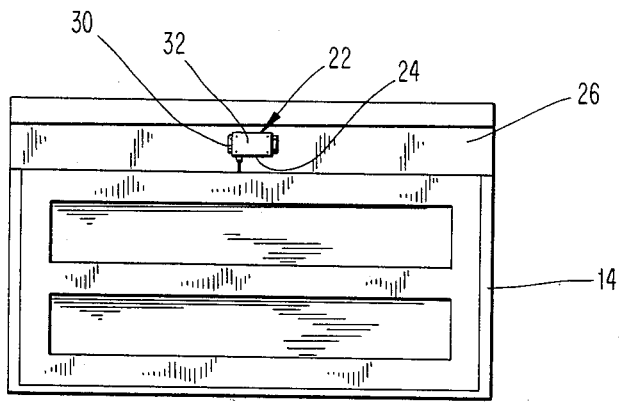

Referring to FIG. 6b, the level warning device 22 includes a housing 24 which is secured to a transverse member 26 of the truck bed by bolts extending through flanges 30 at opposite ends of the housing 24. A removable cover 32 is provided for the housing 24 which is held in place by screws. Referring now also to FIG. 3, the housing 24 is mounted to the truck bed 14 such that its rear wall 36 lies against the transverse member 26 and assumes a vertical orientation when the truck bed 14 is at a level, lowered position. The housing 24 is preferably in the form of a rectangular box which is weather proof and sufficiently strong to withstand battering and substantial amounts of vibration. Preferably, the housing 24 is constructed from sheet steel.

Figure 1:
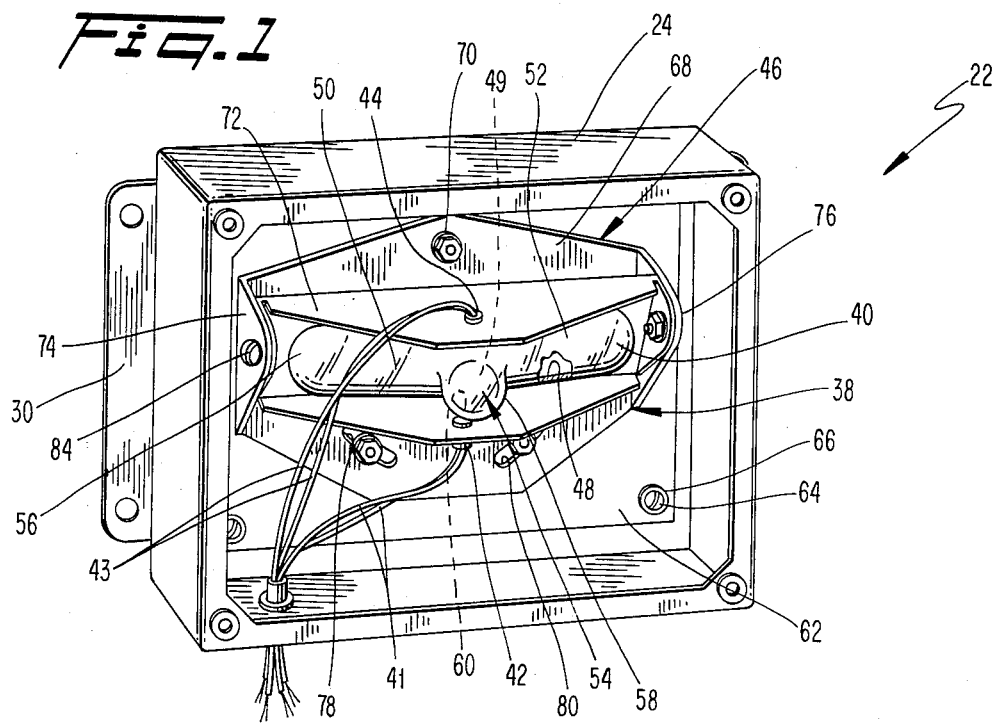
FIG. 1 is a perspective view of a level warning device constructed in accordance with a preferred embodiment of the present invention, with the cover of the device removed.
Figure 2:
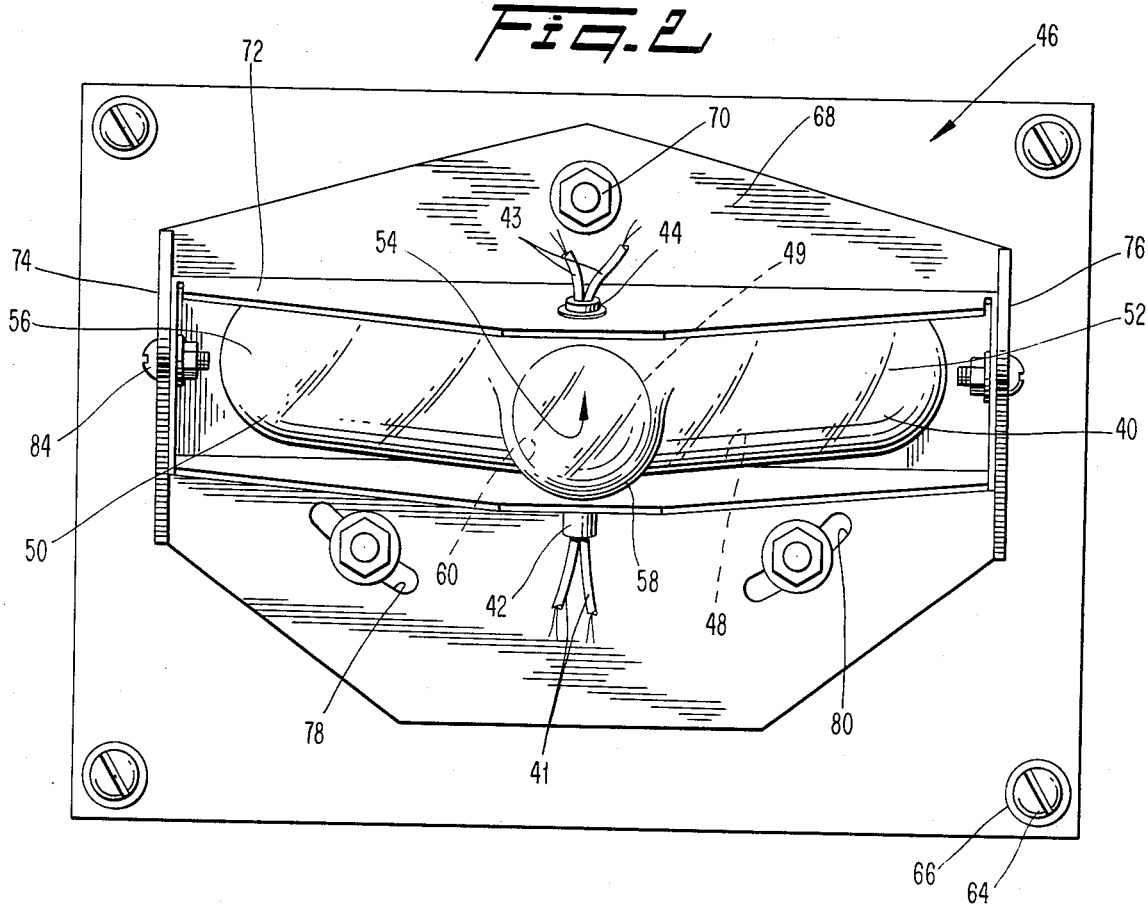
FIG. 2 is a frontal view of elements contained within the housing of the device of FIG. 1.

Referring to FIGS. 1 and 2, the housing 24 contains and protects the triggering unit 38 of the level warning device 22, which unit comprises a light transmissive tubular element 40, an emitter 42 of a continuous beam of infra-red radiation, and a photo-electric switch 44. The triggering unit 38 also includes a lead 41 connecting the emitter 42 to the electrical power system of the truck 12 and a lead 43 connecting the photo-electric switch 44 in circuit with a power source of the truck 12 in accordance with the circuit diagram of FIG. 7. An adjustable mount generally designated 46 is also provided for securing the tubular element 40, the emitter 42 and the switch 44 to the rear wall 36 of the housing 24.

The tubular element 40 defines internally a tubular trackway 48 wherein a metal ball 49 is situated and allowed to roll freely under the influence of gravity. In the preferred embodiment, the tubular element 40 comprises a pair of straight tubular segments 50 and 52 which are joined to each other at a central position 54 of trackway 48 and are inclined oppositely from each other at angles equal to the critical angle of leaning which the truck bed 14 is not allowed to exceed. Each tubular segment has a closed end 56.

The tubular element 40 is preferably constructed from a transparent plastic and also includes a detent 58 at the central position 54 of the trackway 48. The detent 58 defines internally a pocket 60 that is disposed laterally of and is open to the trackway 48. The detent 58 is preferably disposed perpendicularly with respect to a plane within which both axes of the tubular segments 50 and 52 lie. The pocket 60 is sized such that the ball 49 may also freely enter and leave the pocket 60 under the influence of gravity. The pocket 60 is provided with a length sufficient to prevent the ball 49 from escaping when the level warning device 22 is shook from side to side.

The emitter 42 emits a focused beam of infra-red radiation of approximately 200 milliamps of power. Other types of emitters such as laser diodes can be used so long as the photoelectric switch 44 is operable with the particular output of the emitter.

The mount 46 of the triggering unit 38 includes a baseplate 62 which is secured to the housing 24 by screws 64 which extend also through energy-absorbing grommets 66 provided at each corner of the base plate 62. The grommets 66 help dampen vibration which would otherwise be transferred from the truck 12 to the triggering unit 38. The base plate is positioned such that it is parallel to the rear wall 36 of the housing. The mount 46 also includes a bracket element 68 which is adjustably secured to the baseplate 62 by bolts 70, and a mounting tray 72 which is adjustably secured at its ends to the bracket arms 74 and 76 of the bracket element 68. The mounting tray 72 carries the tubular element 40, the emitter 42 and the photo-electric switch 44 such that the positions of these elements relative to each other remain fixed. By reason of the slots 78 and 80 provided in the bracket element 68, the position of the trackway 48 relative to a transverse, horizontal axis may be preadjusted when the level warning device 22 is first installed. The preadjustment is for overcoming any possible misalignment of the housing 24 with respect to a horizontal reference.

Referring now also to FIG. 3, the bracket element 68 holds the mounting tray 72 at a fixed position such that the longitudinal axis 82 of the detent 58 is inclined with respect to a longitudinal axis of the truck bed 14 by an angle which is designated c. In the preferred embodiment, the angle c is equal to 25°, and by reason of this orientation, the ball 49 remains within the detent pocket 60 so long as the truck bed 14 is at its lowered position or at any partially raised position less than the angle c. Once the truck bed 14 is raised to or beyond c (25°), the ball 49 is free to roll out of the pocket 60 and onto the trackway 48 at the central position 54. In this manner, the ball 49 remains seated within the detent pocket 60 until such time that the truck bed 14 is raised to an angle whereat it is first in danger of turning over.

Adjustment of the angle of inclination of the detent 58 is effected by loosening screws 84, repositioning the mounting tray 72 and then retightening the screws 84. By this arrangement, the angle at which the truck bed 14 must be raised to release the ball 49 from the pocket 60 can be adjusted.

Figure 4:
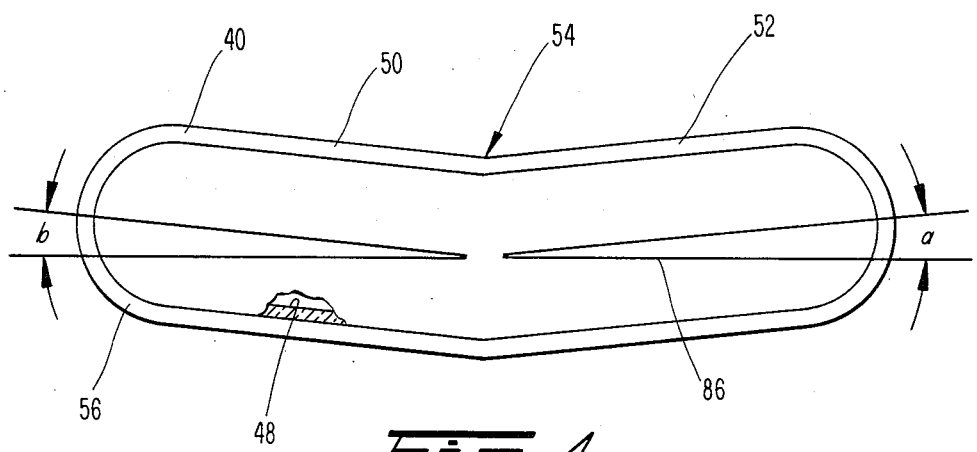
FIG. 4 is a schematic frontal view of the tubular trackway of the present invention as viewed in the direction of the arrow IV in FIG. 3.

Referring now to FIGS. 3 and 4 in the preferred embodiment, the tubular segments 50 and 52 are inclined oppositely from each other at angles a and b from an imaginary horizontal axis 86. Angles a and b are preferably equal to the critical angles of lateral tilt which the truck bed 14 cannot exceed without substantial risk of overturning. In the preferred embodiment, the angles a and b are both equal to 5½. By such arrangement, when the ball 49 of the device rolls out of the detent pocket 60 onto the trackway 48, it will remain at the central position 54 of the trackway until the trailer bed 14 is tilted to or beyond the permissible angles a or b. Thereupon the ball 49 will roll away from the central position 54 which allows the continuous beam from the emitter 42 to pass entirely through the tubular element 40 to strike the receiver of the photo-electric switch 44, which result causes the switch 44 to close a circuit to a warning indicator (FIG. 7) on the dashboard of the tractor 16 or other suitable place. At all other times, when the ball 49 is positioned within the pocket 60 or at the central position 54 of the trackway 48, the ball 49 blocks the transmission of the beam so that the photo-electric switch 44 remains open.

It is to be noted that as the truck bed 14 is raised, the trigger unit 38 and the housing 24 are rotated in the direction of the arrow 88 in FIG. 3. Once the truck bed 14 is at 25°, the detent 58 is horizontally disposed. Because in the preferred embodiment the axis 82 of the detent 58 is perpendicular to the imaginary plane containing the axes of the trackway segments 50 and 52, this imaginary plane of the trackway segments is then vertical as well as transverse to the truck bed 14. At that point, the trackway 48 presents an orientation depicted in FIG. 4. So orientated, the axes of the tubular segments 50 and 52 are inclined 5½ with respect a horizonal, transverse axis 86. Once the ball 49 has rolled into the central position 54 of the trackway 48, the ball 49 will remain there unless the truck bed 14 is tilting to one side or the other by 5½° or more. In such case, the axis of either tubular segment 50 or 52 is canted from the orientation of FIG. 4 to one which coincides or lies below the horizontal axis 86. Accordingly, the ball 49 will roll down that tubular segment under the influence of gravity, exposing the photo-electric switch 44 to the beam of the emitter 42.

It can be appreciated that level warning device 22 can be maintained in an activated state throughout the dumping operations of the dump truck 12, even during on and off road movement of the truck. This advantage is achieved, because the ball 49 is retained within pocket 60 while the truck bed 14 is in its lowered, ready-to-travel position. While there, the ball 49 is prevented from jostling about the trackway 48. Even if the ball 49 manages to escape from the pocket 60 due to an extreme jostle of the dump truck 12, the ball 49 is directed by the pocket 60 into the central position 54 of the tubular element 40 such that the beam from the emitter 42 is nonetheless blocked by the ball 49. Additionally, trackway 48 is devoid of any components which might otherwise be damaged from a collision with the ball 49 during an extreme jostle. Accordingly, the level warning device 22 can remain activated throughout the operation of the truck 12. It is therefore preferred to have the level warning device 22 switched with the ignition switch of the engine of the tractor 16 so that the device 22 remains activated throughout the entire use of the dump truck 12. This arrangement avoids having to rely upon the memory of the truck driver to turn on the device prior to dumping operations. An optional master switch 90 (FIG. 7) is provided in the circuit of the present invention for the convenience of the operator.

It is also noteworthy that once the ball 49 has been delivered upon the trackway 48 from the detent pocket 60, the ball 49 is not required to roll against any electrical contacts or the like such as is found in the trackways of devices of the prior art. Accordingly, the ball 49 of the present invention is allowed to roll free of any interference, thereby enhancing the sensitivity of level warning device 22.

Figure 5:
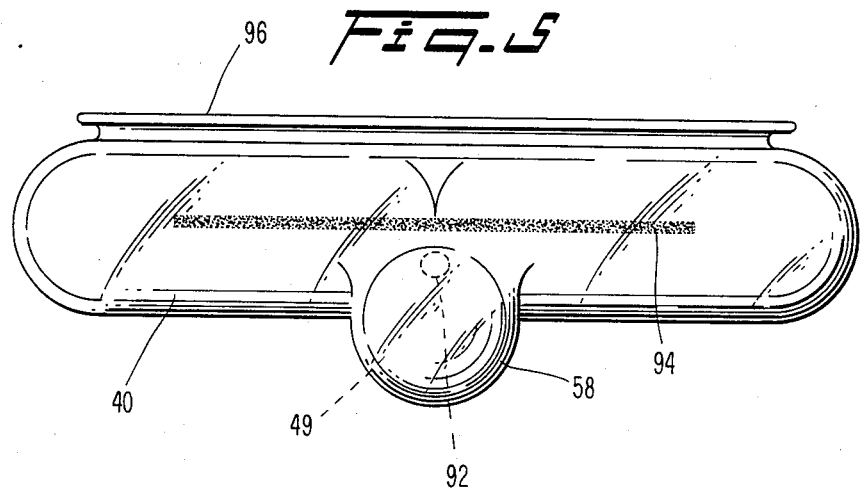
FIG. 5 is a schematic top view of the trackway and detent of the present invention as viewed in the direction of the arrow V in FIG. 3.

Referring to FIGS. 1 and 5, the emitter 42 is mounted upon the mounting tray 72 such that the emitted beam, as indicated by the dashed circle 92 in FIG. 5, enters the tubular element 40 at a location where it impinges upon the ball 49 when the ball 49 is positioned either in the detent pocket 60 or at the central position of the trackway 54. This position of the beam is also lateral of the cross-hatched line 94 on the bottom inside surface of trackway 48, which line 94 indicates the general line of contact between the ball 49 and the trackway 48 when the ball 49 rolls along the trackway 48. The beam is directed through the trackway 48 in this fashion, because after continued use, the plastic of the trackway 48 can become marked along the line of contact 94, which marking might interfere or block the passage of the beam through the trackway 48.

Referring now to FIGS. 3 and 5, the tubular element 40 is provided with a flanged backing 96 which is mounted against the rear wall 98 of the mounting tray 72. Preferably, the flanged backing 96 is held in place either by screws or bonding agent such as an epoxy glue. In the preferred embodiment, the flanged backing 96 is integrally formed with the tubular trackway 48.

Figure 7:
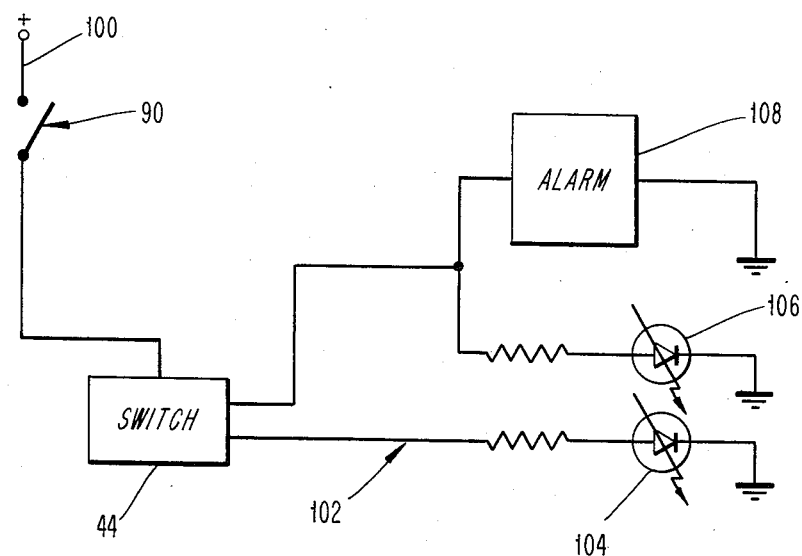
FIG. 7 is a circuit diagram for a level warning device constructed in accordance with the present invention.

FIG. 7 provides a circuit diagram for the level warning device 22 wherein the lead 100 is connected to the electrical system of the truck 12 so that the circuit 102 is switched with the ignition of the engine of the truck 12 as previously discussed. An additional master switch 90 could be provided in the cab of the truck 12 for the convenience of the driver, if desired. As indicated by the circuit diagram, the photo-electric switch 44, when open, maintains a circuit to a green LED 104 for indicating that the level warning device 22 is activated. When the switch 44 closes, the circuit to the green LED 104 is broken and a circuit is completed to a red LED 106 and an optional alarm device 108, such as a buzzer or horn, for indicating that the truck bed 14 is raised and tilting beyond the critical angle a or b.

Figure 8:
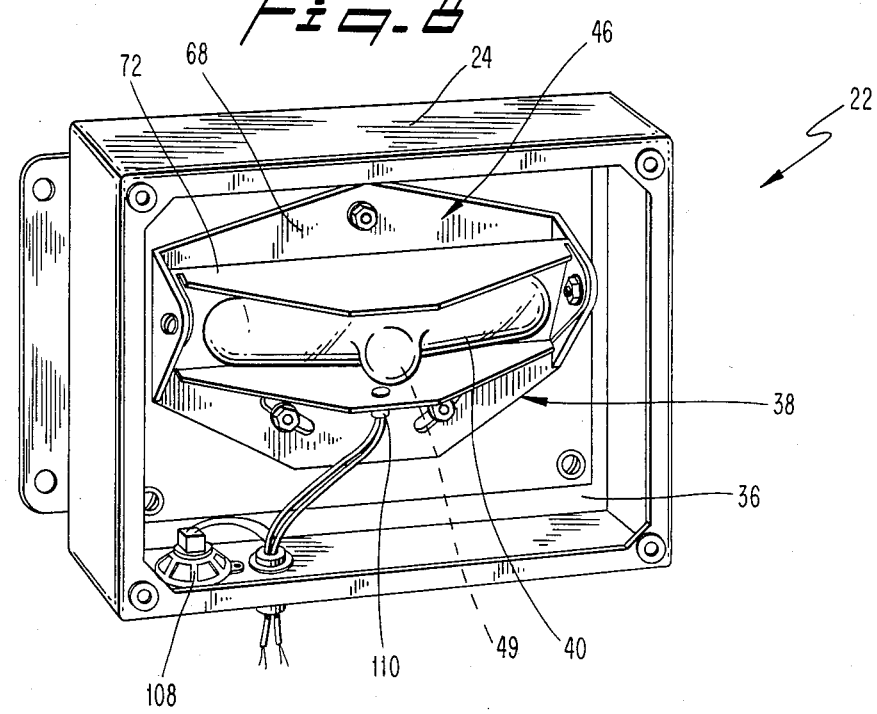
FIG. 8 is a perspective view of a level warning device constructed in accordance with another preferred embodiment of the present invention, with the cover of the unit removed.

Referring to FIG. 8, another preferred embodiment of the present invention positions the alarm device 108 within the housing 24 instead of in the cab of the truck 12. It is also envisioned that the green and red LED's 104 and 106 could also be situated within the housing 24, however such arrangement is not preferred. The embodiment of FIG. 8 also differs from the first embodiment in that the subject embodiment utilizes a unit 110 which combines the photo-electric switch 44 with the emitter 42. The unit 110 maintains the green LED 104 in a lit condition so long as the beam emitted by it is at least partially reflected back to the unit by the ball 49. When the ball 49 has moved out of the detent pocket 60 and away from the central position 54 of the trackway 48, the infra-red beam propagates entirely through the tubular element 40. In that instance the unit 110 does not receive any reflection of the infra-red beam and closes the circuit to the red LED and the optional alarm 108.

Referring to FIG. 9, another preferred embodiment of the present invention replaces the photo-electric switch 44 with a proximity switch 112, which proximity switch senses whether the ball 49 has translated away from the detent 48 and the center position 54 on the trackway 48. Lead 113 connects the proximity switch 112 to the circuit 102. In all other respects, this embodiment is the same as the first preferred one. Experience indicates, however that the proximity switch 112 is a more costly component than the photo-electric switch 44.

Referring to FIG. 10, another embodiment of the present invention replaces the photo-electric switch 44 with a pair of microswitches 114 positioned at each end 56 of the tubular element 40. The arms 116 of the switches 114 extend into the trackway 48 and mechanically trip the respective switches 114 when the ball 49 contacts them. Each microswitch 114 is connected to the circuit 102 by a lead 118. The microswitches 114 provide the advantage that they are inexpensive. The embodiments of FIGS. 9 and 10 each include a detent 58 and are accordingly highly advantageous over the prior art by reason that they can remain activated while the dump truck 12 is driven from place to place without subjecting the driver to intermittent and spurious warning signals.

Turning now to FIGS. 11 and 12, a preferred embodiment of the invention includes a transponder 120 mounted on the truck bed 14 and connected with a switch 44' of the level warning device 22' and a transceiver 122 mounted on the tractor 16 of the truck. The transponder 120 is preferably mounted to the truck bed 14 along with the level warning device 22' as a single unit and is adapted to receive a radio signal transmitted from the transceiver 122 and retransmit a signal indicating the position of the ball 49. The retransmitted signal is then received at the transceiver. Thus, the necessity of wires connecting the level warning device 22 mounted on a truck bed with a remote warning indicator, e.g. a warning lamp or bell in the truck cab, may be eliminated. Additionally, the transponder 120 may be a passive transponder in order to eliminate the necessity of providing either a power source on the truck bed or power wires connecting the transponder to the cab.

Preferably, the level warning device 22' includes a proximity switch 112 (FIG. 9) or a microswitch 114 (FIG. 10) since these embodiments of the level warning device 22' do not require a power source in order to operate. Thus, no wires connecting the level warning device with the truck cab would be necessary. Alternatively, a small battery could be provided to operate a photoelectric switch of the type disclosed in FIGS. 1 through 3. Of course, the battery would have to be checked and periodically replaced to ensure proper operation of the level warning device.

During normal operation, the level sensing device 22' (FIG. 12) acts as an open switch. A transceiver 122 includes a transmitter portion 124 and a receiver portion 126. A modulating signal having a frequency of, for example, 10 kHz, is generated by a modulation signal generator 128 and supplied to a transmitter 130. A carrier signal is then modulated by the modulating signal from the signal generator 128. The fundamental frequency of the transmitter is selected to meet FCC requirements.

A third overtone harmonic filter 132 is provided at the output of the transmitter 130 to prevent false signal reception by the receiver portion 126 which is tuned to a frequency three times the fundamental frequency of the transmitter. Signals passing through the harmonic filter 132 are then broadcast by an antenna 134 which is preferably a dipole-type antenna for directional transmission which is cut to a quarter wavelength of the transmitter carrier signal.

As noted earlier, a passive transponder 120 is preferably provided on the truck bed and is connected with the level warning device 22. The passive transponder 120 includes a receiving antenna 136, a fundamental high Q tank circuit 138, a rectifier 140, an output high Q tank circuit 142, and a transmitting antenna 144. In their simplest form, the tank circuits could be a capacitor and an inductor connected in parallel. The rectifier 140 receives an output from the fundamental high Q tank circuit 138. The level warning device 22' is arranged to ground the output signal from the fundamental high Q tank circuit 138 when the tilt of the truck bed exceeds a safe level.

During normal operation, the signal transmitted by the transmitter portion 124 is received at transponder antenna 136 and fed to the fundamental high Q tank circuit 138. The antenna 136 is preferably a dipole-type antenna cut to a quarter wavelength of the transmitter frequency. The high Q tank circuit 138 is designed to resonate at the transmitter fundamental frequency. The signal is then rectified by the rectifier 140 and supplied to the output high Q tank circuit 142.

The output high Q tank circuit 142 preferably has a resonant frequency three times the transmitter fundamental frequency. When the truck bed is at a safe level, the energy from the rectifier 140 is stored in the high Q tank circuit 142 and causes the tank circuit to oscillate. The oscillation is coupled to a dipole-type antenna 144 which is cut to a quarter wavelength. Thus, the transmitted signal from the transmitter portion 124 is continuously received by the transponder and, during normal conditions, is retransmitted at a frequency three times that of the transmitter carrier signal. The energy of the transmitted signal itself provides energy to operate the transponder so no outside power source such as a battery or a generator is needed for the transponder 120.

If the truck bed is at an unsafe level, the level warning device grounds the fundamental tank circuit 138 to cutoff the signal to the rectifier 40. Thus, the output tank circuit 142 cannot oscillate and no signal is transmitted by the transponder 120.

The receiver portion 126 of the transceiver 122 includes a receiver 146 tuned to the third harmonic of the transmitter fundamental frequency. The retransmitted signal from the transponder 120 is monitored by the receiver 146 and, in the absence of a retransmitted signal, an alarm control circuit 148 activates an alarm such as a warning lamp or horn. The alarm control circuit 148 preferably includes a circuit to identify the modulated signal from the transmitter portion to ensure that the correct signal is received from the transponder 120.

Due to energy losses, the output signal of the transponder 120 will be approximately one-third the power of the signal received from the transmitter. The amount of losses in the transponder circuit 120 can be minimized by proper selection of circuit components, impedance match, circuit layout, antenna layout, etc. In any event, however, the third harmonic signal transmitted by the transponder 120 will be a low power signal.

The power of the signal from the transponder 120 can be increased by using a high power transmitter in the transceiver 122. However, a high power transmitter increases the size of the transmitter portion 124 and reduces economy. Additionally, a low power transmitter has a limited range and will thus be less likely to interfere with other nearby systems.

A preferred solution to the problem presented by the low power signal from the transponder 120 is to provide the receiver portion 126 with a superheterodyne receiver with high sensitivity (e.g. 1 microvolt). The use of a superheterodyne receiver permits the transmitter to remain as small and economical as possible, and minimizes interference between systems.

It will be readily appreciated that minor changes in the preferred embodiment may be made without departing from the spirit of the invention. For example, the transceiver 122 can be replaced with a separate transmitter and receiver. This would permit greater flexibility in the location of the individual system components.

Other variations and changes to the present invention will become readily apparent to one skilled in the art upon reading the present specification. For instance, the manner by which the tubular element is mounted to the truck bed or within the housing could be done in a number of different ways which would be obvious to one skilled in the art upon his or her familiarization with this disclosure. Also, the tubular element might be constructed from a single arched piece of tubing as opposed to the specific structure shown in the preferred embodiments. Moreover, the positioning and the type of switch might be further varied without departing from the invention. Thus it is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A level warning arrangement for vehicles with raisable beds, which arrangement provides a warning if the bed tilts laterally beyond a critical angle when the bed is raised, said arrangement comprising:
   a light transmissive tubular trackway comprising inclined straight tubular segments joined together at a central region of said trackway and inclined oppositely from each other at angles substantially equal to said critical angle and a detent at said central region, said detent transversely disposed to said inclined segments, said detent defining a pocket lateral of said tubular trackway, said trackway substantially free of liquid;
   a ball capable of translating into and out of said pocket and within said tubular segments under the influence of gravity;
   photo-electric means for detecting movement of said ball away from said central region;
   a warning indicator controlled by said photo-electric means; and
   means for mounting said tubular trackway to said bed so that said trackway segments may extend transversely with respect to said bed with said detent being inclined downwardly with respect to a longitudinal axis of said bed;
   wherein said photo-electric means includes a beam source and a photo-electric switch arranged with the beam source as a single unit, said unit located in proximity of said central region so that when said ball is positioned at said central region including said detent, said ball reflects output of said beam source toward said photo-electric switch, said photo-electric switch activating said warning indicator whenever said switch fails to receive output of said beam source.

2. A level warning arrangement for vehicles with raisable beds, which arrangement provides a warning if the bed tilts laterally beyond a critical angle when the bed is raised, said arrangement comprising:
   a light transmissive tubular trackway comprising inclined straight tubular segments joined together at a central region of said trackway and inclined oppositely from each other at angles substantially equal to said critical angle and a detent at said central region, said detent transversely disposed to said inclined segments, said detent defining a pocket lateral of said tubular trackway, said trackway substantially free of liquid;
   a ball capable of translating into and out of said pocket and within said tubular segments under the influence of gravity;
   photo-electric means for detecting movement of said ball away from said central region;
   a warning indicator controlled by said photo-electric means; and
   means for mounting said tubular trackway to said bed so that said trackway segments may extend transversely with respect to said bed with said detent being inclined downwardly with respect to a longitudinal axis of said bed, said mounting means including a tray for supporting said trackway and said photo-electric means in a fixed relationship with respect to each other, said mounting means also including means for adjusting the orientation of said tray, whereby the inclination of said detent may be adjusted.

3. The arrangement as claimed in claim 2, wherein said tray is enclosed within a housing.

4. The arrangement as claimed in claim 3, wherein said warning indicator is enclosed within said housing.

5. A level warning arrangement for vehicles having a raisable bed, said arrangement comprising:
   a tubular trackway having upwardly inclined segments joined together at a first location along said trackway, said trackway substantially free of liquid;
   a detent extending from said trackway at said first location along said tubular element, said detent defining a pocket lateral of said lateral trackway;
   a ball capable of translating under the influence of gravity into and out of said pocket and within said tubular trackway;
   a warning indicator;
   means for actuating said warning indicator responsive to absence of said ball from said first location and said detent, said actuating means including a trackway which is light transmissive, an emitter adapted to emit a beam of radiation transversely through said trackway in proximity of said first location and a photo-electric switch positioned to receive said beam, said warning indicator operatively connected to photo-electric switch, said emitter and the photo-electric switch are within a single unit, said photoelectric switch remaining open whenever said switch is sturck by a portion of said beam reflected off said ball; and
   means for mounting said trackway to said bed so that said trackway segments may extend transversely with respect to said bed with said detent being inclined downwardly with respect to a longitudinal axis of said bed.

* * * * *